(12) United States Patent  
Chilton

(10) Patent No.: US 12,358,520 B2  
(45) Date of Patent: Jul. 15, 2025

(54) ENHANCED MAP DISPLAY FOR AUTONOMOUS VEHICLES AND PASSENGERS

(71) Applicant: TORC Robotics, Inc., Blacksburg, VA (US)

(72) Inventor: Ryan Chilton, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 69 days.

(21) Appl. No.: 18/125,347

(22) Filed: Mar. 23, 2023

(65) Prior Publication Data

US 2024/0317250 A1   Sep. 26, 2024

(51) Int. Cl.

| | |
|---|---|
| *B60W 50/14* | (2020.01) |
| *B60K 35/00* | (2006.01) |
| *B60W 30/14* | (2006.01) |
| *B60W 30/18* | (2012.01) |
| *B60W 60/00* | (2020.01) |
| *B60K 35/28* | (2024.01) |

(52) U.S. Cl.
CPC ............. *B60W 50/14* (2013.01); *B60K 35/00* (2013.01); *B60W 30/143* (2013.01); *B60W 30/18163* (2013.01); *B60W 60/0011* (2020.02); *B60K 35/28* (2024.01); *B60K 2360/177* (2024.01); *B60K 2360/178* (2024.01); *B60W 2050/146* (2013.01); *B60W 2300/12* (2013.01)

(58) Field of Classification Search
CPC .............. B60W 50/14; B60W 30/143; B60W 30/18163; B60W 60/0011; B60W 2050/146; B60W 2300/12; B60K 35/00; B60K 35/28; B60K 2360/177; B60K 2360/178

See application file for complete search history.

(56) References Cited

U.S. PATENT DOCUMENTS

| 10,773,732 | B1 * | 9/2020 | Alexander | ........... G05D 1/0212 |
|---|---|---|---|---|
| 11,564,073 | B2 * | 1/2023 | Tian | ................ G06V 20/59 |
| 11,938,963 | B1 * | 3/2024 | Joubert | ............... B60W 40/10 |
| 12,066,842 | B2 * | 8/2024 | Otaki | ................. B60W 60/001 |
| 2005/0225457 | A1 * | 10/2005 | Kagawa | ............. G08G 1/0965 |
| | | | | 340/995.13 |
| 2006/0181431 | A1 * | 8/2006 | Konishi | ................ G08G 1/163 |
| | | | | 340/439 |
| 2009/0289955 | A1 | 11/2009 | Douris et al. | |
| 2009/0309757 | A1 * | 12/2009 | Mudalige | ............... G08G 1/164 |
| | | | | 340/936 |
| 2012/0296561 | A1 | 11/2012 | Park et al. | |
| 2013/0261947 | A1 * | 10/2013 | Yamashiro | ............. G08G 1/163 |
| | | | | 701/300 |

(Continued)

*Primary Examiner* — Curtis J King

(74) *Attorney, Agent, or Firm* — Armstrong Teasdale LLP

(57) ABSTRACT

Disclosed herein are methods and systems to provide intelligent display for vehicles including a method that comprises determining, by a processor, that a current trajectory of an autonomous vehicle includes a revised road condition having at least one attribute; retrieving, by the processor using the at least one attribute, a graphical overlay corresponding to the revised road condition; and displaying, by the processor on an electronic device associated with the autonomous vehicle, the graphical overlay while the electronic device is presenting an image of a surrounding of the autonomous vehicle.

20 Claims, 8 Drawing Sheets

(56) References Cited

U.S. PATENT DOCUMENTS

| | | | |
|---|---|---|---|
| 2016/0091612 A1* | 3/2016 | Heo | G01S 13/931 |
| | | | 701/468 |
| 2016/0240012 A1 | 8/2016 | Gruenler et al. | |
| 2017/0132916 A1* | 5/2017 | Ioli | G08G 1/005 |
| 2018/0261081 A1* | 9/2018 | Suzuki | B60Q 1/525 |
| 2019/0018418 A1* | 1/2019 | Tseng | H04W 4/44 |
| 2019/0066382 A1* | 2/2019 | Kubo | G01C 21/3667 |
| 2019/0120964 A1* | 4/2019 | Luo | G01S 7/4817 |
| 2019/0137287 A1* | 5/2019 | Pazhayampallil | G05D 1/0291 |
| 2019/0258245 A1* | 8/2019 | Nakamura | B62D 15/0285 |
| 2019/0303673 A1* | 10/2019 | Li | G06F 3/013 |
| 2019/0359228 A1 | 11/2019 | Banno et al. | |
| 2020/0010095 A1* | 1/2020 | Kim | B60W 30/02 |
| 2020/0184727 A1 | 6/2020 | Ha et al. | |
| 2020/0216079 A1* | 7/2020 | Mahajan | B60W 60/0051 |
| 2020/0250980 A1* | 8/2020 | Harbach | H04W 4/46 |
| 2021/0024085 A1* | 1/2021 | Kitagawa | B60W 30/10 |
| 2021/0086793 A1* | 3/2021 | Stefan | G06V 10/82 |
| 2021/0107487 A1* | 4/2021 | Oh | G08G 1/167 |
| 2021/0162865 A1* | 6/2021 | Ogata | B60K 35/00 |
| 2021/0209940 A1* | 7/2021 | Tanaka | H04W 4/024 |
| 2021/0213935 A1* | 7/2021 | Lu | B60C 23/04 |
| 2021/0237775 A1* | 8/2021 | Bieg | B60W 50/0097 |
| 2021/0266990 A1* | 8/2021 | Cui | H04W 8/26 |
| 2022/0032904 A1* | 2/2022 | Lee | B60K 35/00 |
| 2022/0363291 A1* | 11/2022 | Iwamoto | B60W 60/007 |
| 2022/0366788 A1* | 11/2022 | Iwamoto | G01C 21/3415 |
| 2023/0063622 A1* | 3/2023 | Hamada | G08G 1/0141 |
| 2023/0106909 A1* | 4/2023 | Ogata | G09G 3/002 |
| | | | 701/437 |
| 2023/0166771 A1* | 6/2023 | Fernandez-Moral | |
| | | | G05D 1/227 |
| | | | 701/2 |
| 2023/0290157 A1 | 9/2023 | Yashunin et al. | |
| 2023/0311855 A1* | 10/2023 | Rodriguez Hervas | |
| | | | B60W 50/14 |
| | | | 701/25 |
| 2023/0392948 A1* | 12/2023 | Shanta | G01C 21/3691 |
| 2024/0001951 A1* | 1/2024 | Gray | B60W 40/08 |
| 2024/0036566 A1* | 2/2024 | Moser | G05D 1/0016 |
| 2024/0036567 A1* | 2/2024 | Moser | G05D 1/0038 |
| 2024/0036574 A1* | 2/2024 | Moser | G05D 1/2246 |
| 2024/0053742 A1* | 2/2024 | Moser | G05D 1/65 |
| 2024/0157935 A1* | 5/2024 | Esna Ashari Esfahani | |
| | | | B60W 30/0956 |
| 2024/0174222 A1* | 5/2024 | Ventura | B60W 30/09 |
| 2024/0177609 A1* | 5/2024 | Lim | G08G 1/166 |
| 2024/0335741 A1 | 10/2024 | Xue et al. | |

* cited by examiner

ENHANCED MAP DISPLAY FOR AUTONOMOUS VEHICLES AND PASSENGERS

TECHNICAL FIELD

The present disclosure relates generally to autonomous vehicles and, more specifically, to systems and methods for autonomous vehicle operation.

BACKGROUND

The use of autonomous vehicles has become increasingly prevalent in recent years, with the potential for numerous benefits, such as improved safety, reduced traffic congestion, and increased mobility for people with disabilities.

Many autonomous vehicles rely on the ingestion of road data in order to operate effectively. This data includes information about the road network, such as the layout of roads, the location of obstacles, and the rules of the road. By ingesting this data, autonomous vehicles are able to make real-time decisions about their environment and navigate safely. Effectively, many autonomous vehicles generate maps that include extracted data (e.g., extracted from data received from various sensors) needed to autonomously navigate through their environment. The ability to effectively process road data is critical for the safe and efficient operation of autonomous vehicles, as it enables autonomy systems to make informed decisions about their surroundings and respond to changing conditions in real-time. As the technology behind autonomous vehicles advances, there is a growing trend towards a reduction in the need for physical signs, such as temporary signage needed for human drivers to identify temporary events requiring revised road conditions.

SUMMARY

The systems and methods of the present disclosure may solve the problems set forth above and/or other problems in the art. The scope of the current disclosure is defined by the attached claims, and not by the ability to solve any specific problem. Disclosed herein are methods and systems for enhancing the driver's display for operating autonomous (or partially autonomous) vehicles.

In one embodiment, a method comprises determining, by a processor, that a current trajectory of an autonomous vehicle includes a revised road condition having at least one attribute; retrieving, by the processor using the at least one attribute, a graphical overlay presenting a virtual object corresponding to the revised road condition having the at least one attribute, wherein the virtual object represents an object that is not captured by at least one sensor of the autonomous vehicle; and presenting, by the processor for display on an electronic device associated with the autonomous vehicle, the graphical overlay while the electronic device is presenting a view of a surrounding of the autonomous vehicle.

The graphical overlay may be presented as an augmented reality presentation.

The revised road condition may corresponds to construction work performed and the graphical overlay comprises a lane change.

The method may comprise presenting, by the processor, a notification indicating that at least one road condition has been revised.

Determining that the current trajectory of the autonomous vehicle may include a revised road condition corresponds to receiving an indication from a second processor. Determining that the current trajectory of the autonomous vehicle may include a revised road condition corresponds to receiving an indication of the revised road condition within the road.

The method may comprise revising, by the processor, a velocity of the autonomous vehicle in accordance with the revised road condition.

The method may comprise identifying, by the processor, an alternative trajectory for the autonomous vehicle in accordance with the revised road condition.

In another embodiment, a system may comprise one or more processors, wherein the one or more processors are configured execute instructions on a non-transitory computer-readable medium to: determine that a current trajectory of an autonomous vehicle includes a revised road condition having at least one attribute; retrieve, using the at least one attribute, a graphical overlay presenting a virtual object corresponding to the revised road condition having the at least one attribute, wherein the virtual object represents an object that is not captured by at least one sensor of the autonomous vehicle; and present for display, on an electronic device associated with the autonomous vehicle, the graphical overlay while the electronic device is presenting a view of a surrounding of the autonomous vehicle.

The graphical overlay may be presented as an augmented reality presentation.

The revised road condition may correspond to construction work performed and the graphical overlay comprises a lane change.

The one or more processors may be configured to present a notification indicating that at least one road condition has been revised.

Determining that the current trajectory of the autonomous vehicle includes a revised road condition may correspond to receiving an indication from a second processor.

The one or more processors may be configured to determine that the current trajectory of the autonomous vehicle includes a revised road condition corresponds to receiving an indication of the revised road condition within the road.

The one or more processors may be configured to revise a velocity of the autonomous vehicle in accordance with the revised road condition.

The one or more processors may be configured to identify an alternative trajectory for the autonomous vehicle in accordance with the revised road condition.

In yet another embodiment, a non-transitory computer readable medium includes one or more instructions stored thereon and executable by a processor to: determine that a current trajectory of an autonomous vehicle includes a revised road condition having at least one attribute; retrieve, using the at least one attribute, a graphical overlay presenting a virtual object corresponding to the revised road condition having the at least one attribute, wherein the virtual object represents an object that is not captured by at least one sensor of the autonomous vehicle; and present for display, on an electronic device associated with the autonomous vehicle, the graphical overlay while the electronic device is presenting a view of a surrounding of the autonomous vehicle.

The graphical overlay may be presented as an augmented reality presentation.

The processor may be configured to determine that the current trajectory of the autonomous vehicle includes a revised road condition corresponds to receiving an indication of the revised road condition within the road.

The processor may be configured to revise a velocity of the autonomous vehicle in accordance with the revised road condition.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
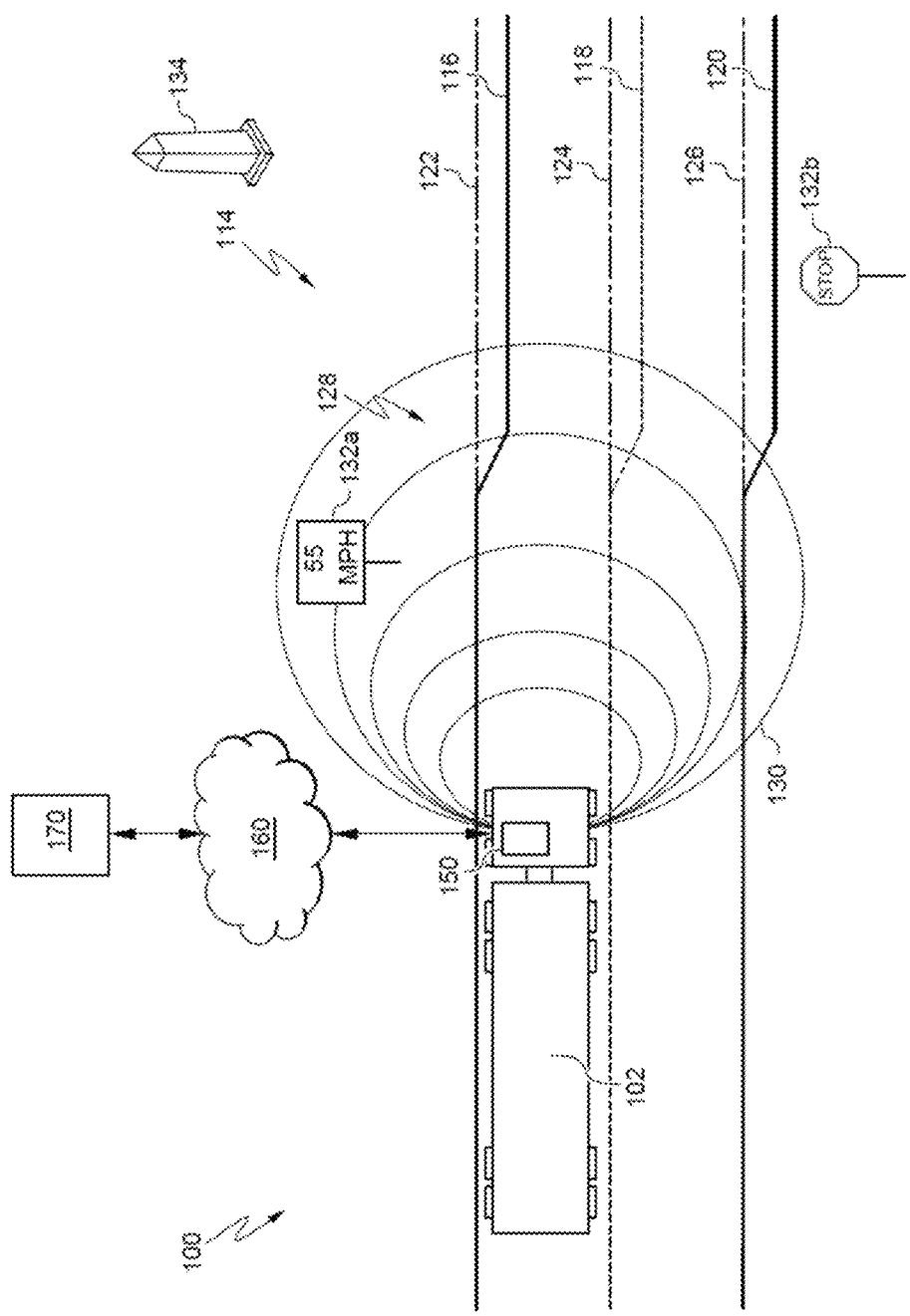
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The maps/localization aspect of the autonomy system 150 may be configured to determine where on a pre-established digital map the truck 102 is currently located. One way to do this is to sense the environment surrounding the truck 102 and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
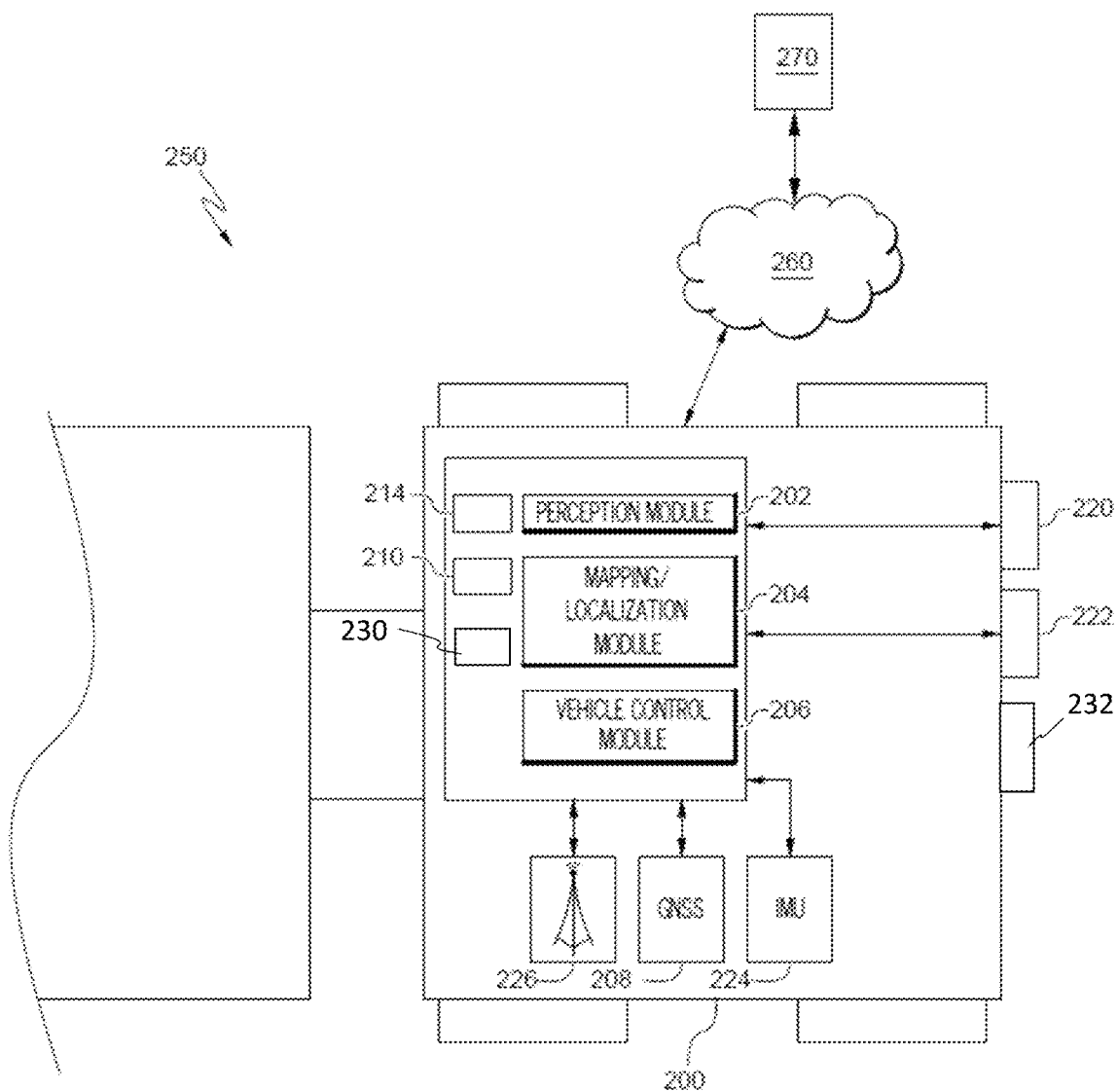
FIG. 2 is a schematic of the autonomy system of the vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field-of-view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared (IR) light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer, or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the autonomy system 250 to navigate or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand. In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 260. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck 260. Various other known circuits may be associated with the autonomy system 250, including signal-conditioning circuitry, communication circuitry, actuation circuitry, and other appropriate circuitry.

Figure 5:
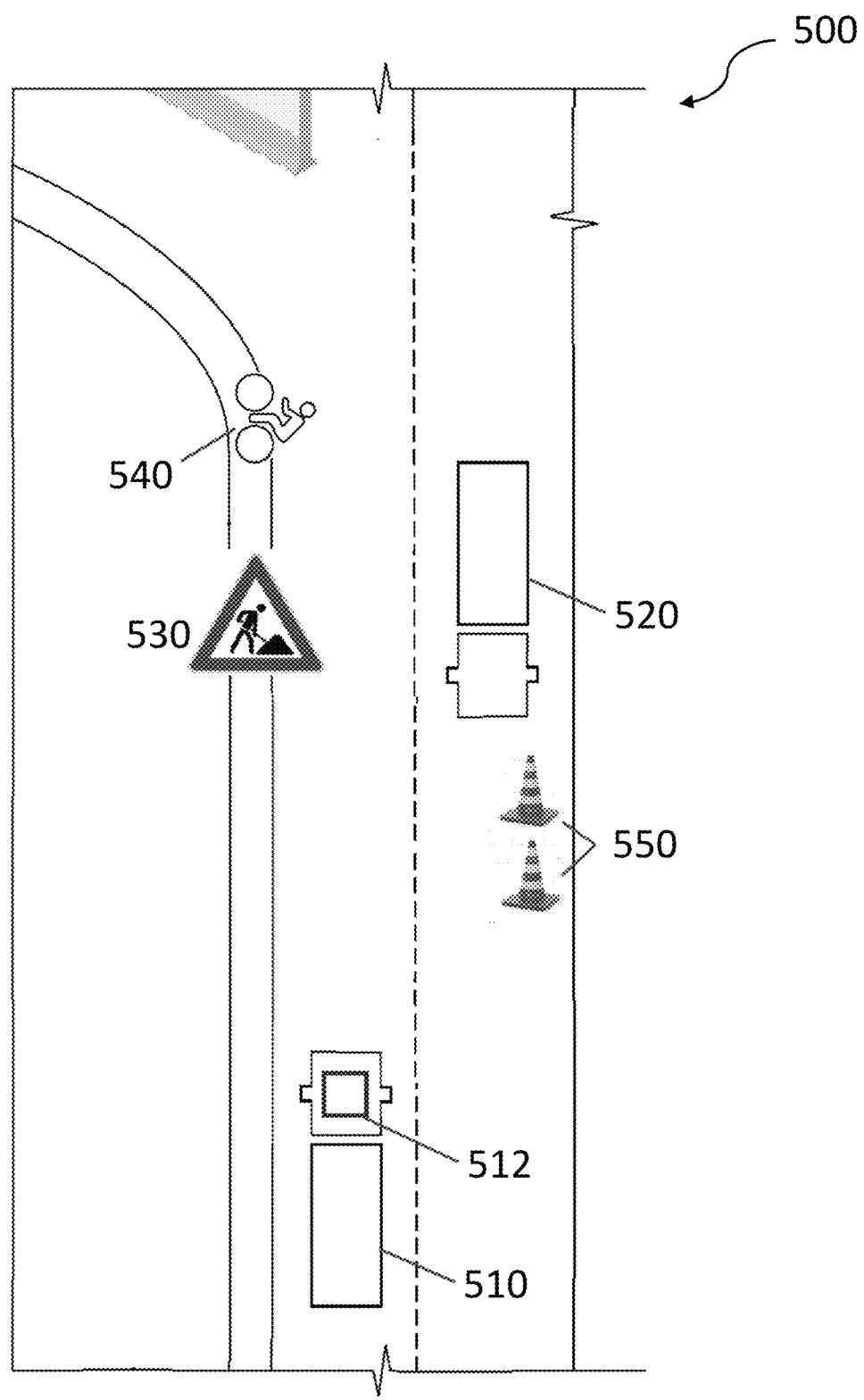
FIG. 5 is a bird's eye view of a roadway scenario including a schematic representative of an autonomous vehicle, according to an embodiment.

The memory 214 of autonomy system 250 may store data and/or software routines that may assist the autonomy system 250 in performing its functions, such as the functions of the perception module 202, the mapping/localization module 204, the vehicle control module 206, a collision analysis module 230, the method 500 described herein with respect to FIG. 5, and the method 600 described herein with respect to FIG. 6. Further, the memory 214 may also store data received from various inputs associated with the autonomy system 250, such as data from the perception system.

As noted above, perception module 202 may receive input from the various sensors, such as camera system 220, LiDAR system 222, GNSS receiver 208, and/or IMU 224 (collectively "perception data") to sense an environment surrounding the truck 260 and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The system 100 may collect perception data. The perception data may represent the perceived environment surrounding the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously. With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines 116, 118, 120 that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132a, 132b and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.) that may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.)

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 200. For example, once the systems on the truck 200 have determined its location with respect to map features (e.g., intersections, road signs, lane lines, etc.) the truck 200 may use the vehicle control module 206 and its associated systems to plan and execute maneuvers and/or routes with respect to the features of the environment. The vehicle control module 206 may make decisions about how the truck 200 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system, etc.) The vehicle control module 206 may be configured to avoid obstacles in the environment surrounding the truck 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

In disclosed embodiments of a system for planning paths that will minimize the severity of a collision, the system 100, 250 collects perception data on objects that satisfy predetermined criteria for likelihood of collision with the ego vehicle. Such objects are sometimes referred to herein as target objects. Collected perception data on target objects may be used in collision analysis.

In an embodiment, collision analysis module 230 executes an artificial intelligence model to predict one or more attributes of detected target objects. The artificial intelligence model may be configured to ingest data from at least one sensor of the autonomous vehicle and predict the attributes of the object. In an embodiment, the artificial intelligence module is configured to predict a plurality of predetermined attributes of each of a plurality of detected target objects relative to the autonomous vehicle. The predetermined attributes may include a relative velocity of the respective target object relative to the autonomous vehicle and an effective mass attribute of the respective target object. In an embodiment, the artificial intelligence model is a predictive machine learning model that may be continuously trained using updated data, e.g., relative velocity data, mass attribute data, and target objects classification data. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

Figure 3:
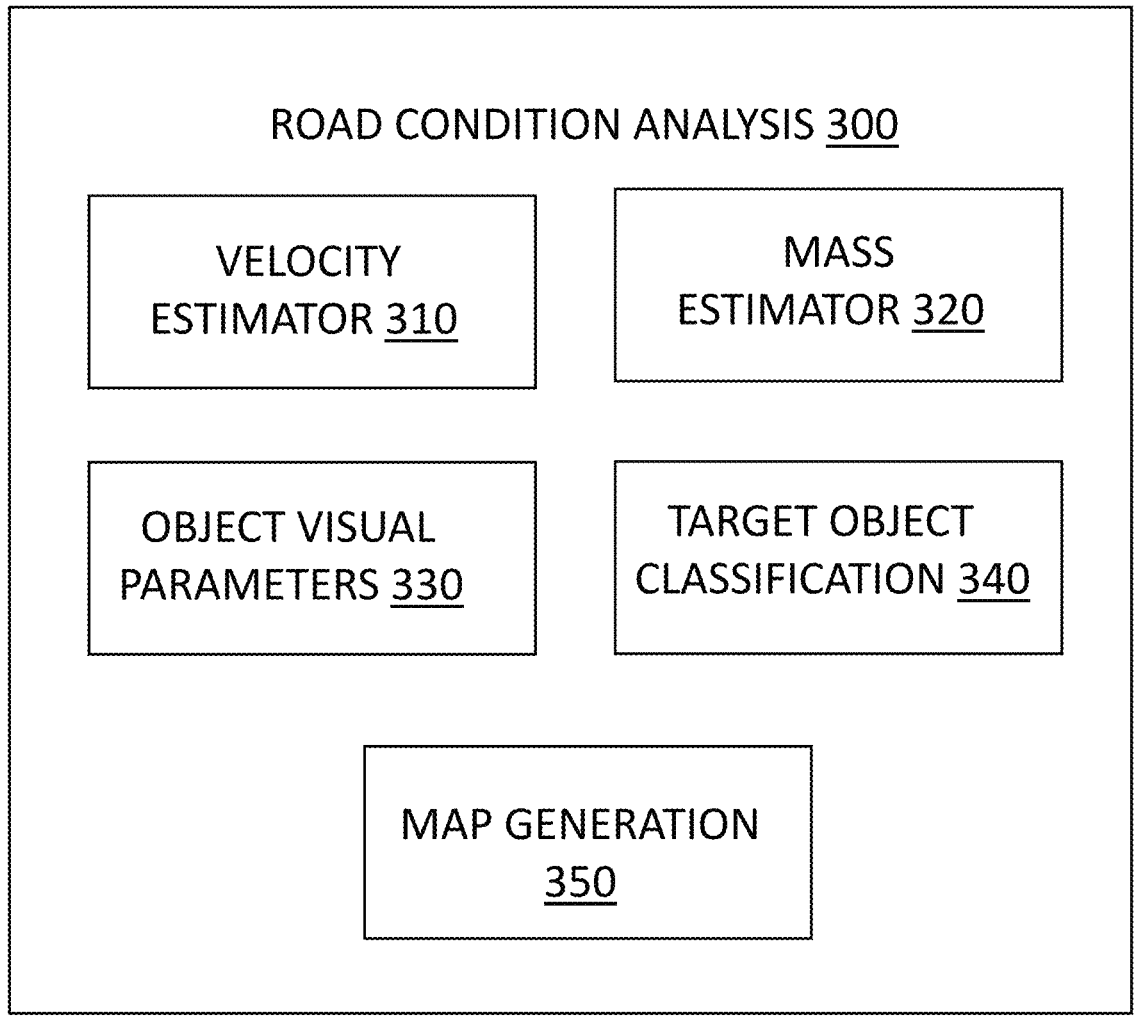
FIG. 3 is a schematic diagram of a collision analysis module of the autonomy system of the vehicle, according to an embodiment.

FIG. 3 shows a road condition analysis module 300 of system 100, 250. The road condition analysis module 300 includes velocity estimator 310, effective mass estimator 320, object visual parameters component 330, and target object classification component 340. These components of road condition analysis module 300 may be either or both software-based components and hardware-based components.

Velocity estimator 310 may determine the relative velocity of target objects relative to the ego vehicle. Effective mass estimator 320 may estimate effective mass of target objects, e.g., based on object visual parameters signals from object visual parameters component 330 and object classification signals from target object classification component 340. Object visual parameters component 330 may determine visual parameters of a target object such as size, shape, visual cues and other visual features in response to visual sensor signals, and generates an object visual parameters signal. Target object classification component 340 may determine a classification of a target object using information contained within the object visual parameters signal, which may be correlated to various objects, and generates an object classification signal. For instance, the target object classification component 340 can determine whether the target object is a plastic traffic cone or an animal.

Target objects may include moving objects such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects can be infrastructure objects as well as temporarily static objects such as parked cars. Systems and methods herein may aim to choose a collision path that may involve a surrounding inanimate object. The systems and methods aim to avoid a vulnerable pedestrian, bicyclist, motorcycle, or other targets involving people or animate beings, and this avoidance is a priority over a collision with an inanimate object.

Externally-facing sensors may provide system 150, 250 with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

In an embodiment, the system 150, 250 collects data on target objects within a predetermined region of interest (ROI) in proximity to the ego vehicle. Objects within the ROI satisfy predetermined criteria for likelihood of collision with the ego vehicle. The ROI is alternatively referred to herein as a region of collision proximity to the ego vehicle. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

Using the data collected, a map generation module 350 may generate a high-definition (HD) map used by the autonomous vehicle to navigate. The map generation module 350 may generate an HD map by utilizing various data sources and advanced algorithms. The data sources may include information from onboard sensors, such as cameras, LiDAR, and radar, as well as data from external sources, such as satellite imagery and information from other vehicles. The map generation module 350 may collect and process the data from these various sources to create a high-precision representation of the road network. The map generation module 350 may use computer vision techniques, such as structure from motion, to process the data from on-board sensors and create a 3D model of the environment. This model may then be combined with the data from external sources to create a comprehensive view of the road network.

The map generation module 350 may also apply advanced algorithms to the data, such as machine learning and probabilistic methods, to improve the detail of the road network map. The algorithms may identify features such as lane markings, road signs, traffic lights, and other landmarks, and label them accordingly. The resulting map may then be stored in a format that can be easily accessed and used by the autonomous vehicle.

The map generation module 350 may use real-time updates from the vehicle's onboard sensors to continuously update the HD map as the vehicle moves. This enables the vehicle to maintain an up-to-date representation of its surroundings and respond to changing conditions in real-time.

The ability to generate an HD map may allow for safe and efficient operation of autonomous vehicles, as the map provides a detailed, up-to-date representation of the road network that the vehicle can use to navigate and make real-time decisions.

Using the methods and systems discussed herein, a processor of the autonomous vehicle may generate an HD map, revise the HD map using various data (e.g., from identified road signs or received from a server), and/or display the map for a human driver.

Figure 4:
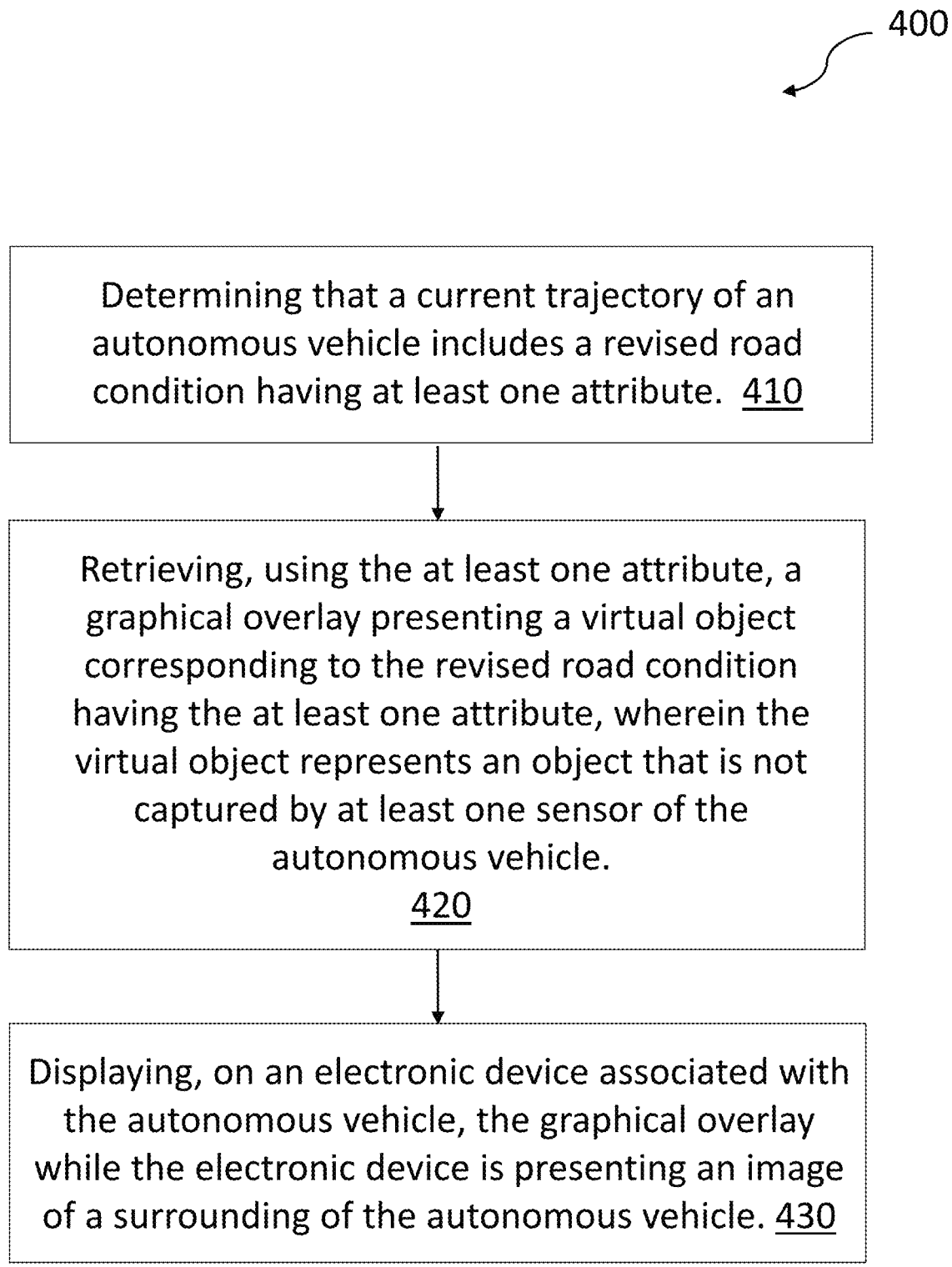
FIG. 4 is a method of intelligently displaying road conditions, according to an embodiment

FIG. 4 shows execution steps of a processor-based method using the system 150, 250, and 300 according to some embodiments. The method 400 shown in FIG. 4 comprises execution steps 410-430. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 4 is described as being performed by a processor, such as the processor 210 depicted in FIG. 2. However, in some embodiments, one or more of the steps may be performed by a different processor, server, or any other computing feature. For instance, one or more of the steps may be performed via a cloud-based service or another processor in communication with the processor of the autonomous vehicle and/or its autonomy system.

Although the steps are shown in FIG. 4 having a particular order, it is intended that the steps may be performed in any order. It is also intended that some of these steps may be optional.

At step 410, the processor determines that a current trajectory of an autonomous vehicle includes a revised road condition having at least one attribute. As discussed herein, the processor may periodically communicate with the sensors of the autonomous vehicle. Therefore, the processor may be configured/programmed to periodically determine a trajectory for the autonomous vehicle and determine whether the autonomous vehicle is on a path that includes any target objects (e.g., potential collisions) and/or revised road conditions, such as any event that would require a temporary revision in the operations of the autonomous vehicle. Using various location-tracking methods, the processor may communicate the location of the autonomous vehicle with a server that has real-time or near real-time data associated with various events. For instance, the processor may transmit a location of the autonomous vehicle to the server along with a query to identify any events within a 5 mile radius of the autonomous vehicle. As a result, the processor may receive a list of events within the 5 mile radius of the autonomous vehicle.

As used herein, an event may include any condition or situation that necessitates a change in the autonomous vehicle's trajectory, such as revised road conditions. For instance, construction being performed on a road may be an event because it causes lanes to change and may require a temporary reduction of speed for all nearby vehicles. In this example, a processor may dynamically adjust a speed limit near a construction zone from 65 mph to 50 mph. The processor may cause a graphical overlay to present a speed limit sign that can be observed by a driver. Upon the change of the speed limit to 50 mph, the autonomous vehicle and the driver will be aware of the new speed limit in this zone.

In some embodiments, a construction zone may require detouring and/or a complete change of path. In an example, the processor may dynamically change a geometry of a lane to shift traffic and avoid an obstacle, such as construction, first responders, disabled car, or dead animal. The processor can present new virtual lane lines for a lane that may redirect the traffic from original lane lines on a road or may present virtual lane lines for a road that does not have any lane lines on the road.

Additionally or alternatively, the processor uses data from sensors in communication with the autonomous vehicle, such as cameras and LiDAR, to detect and locate the event. Specifically, the information retrieved via different sensors may be analyzed, such that the processor can determine if the autonomous vehicle has a trajectory that includes an event. In a non-limiting example, the event may refer to construction work being performed, which would require the autonomous vehicle to (at least temporarily) alter its trajectory (e.g., change its path or velocity). Using cameras associated with the autonomous vehicle, the processor may detect one or more traffic cones (pylons) indicating that the autonomous vehicle is near a construction site.

The processor may use a filtering mechanism to determine a subset of the events that are within a current/future trajectory of the autonomous vehicle, such as depicted in FIG. 5.

FIG. 5 depicts a bird's-eye view of roadway scenario 500, including a schematic representation of an autonomous vehicle 510 and various target objects surrounding the autonomous vehicle 510. The roadway scenario 500 includes a two-lane roadway with traffic flow in two directions (autonomous vehicle 510 and oncoming vehicle 520). The roadway scenario 500 may also include a bike lane with a cyclist 540.

In the depicted example, the autonomous vehicle 510 contains an autonomy system 512 configured to detect target objects in a region of collision proximity to the autonomous vehicle 510. Target objects include various moving objects, including the oncoming vehicle 520 and the cyclist 540 in the bike lane. Target objects may also include static objects, including parked vehicles, rigid concrete traffic barriers, traffic cones, and the like. During travel of the autonomous vehicle, the autonomy system 512 senses the surrounding target objects. Specifically, the autonomy system 512 senses a target object 530. Using various methods, the autonomy system 512 determines that the target object 530 is a sign indicating that the autonomous vehicle 510 may be entering (or approaching) a construction site. In another example, the autonomy system 512 also identifies traffic cones 550, which indicate a second construction site may be nearby.

The autonomy system 512 may then determine that the first construction site (associated with the sign 530) has a high likelihood of being within a current trajectory of the autonomous vehicle 510. In contrast, the autonomy system 512 may determine that the construction site associated with the traffic cones 550 are not within the current path/trajectory of the autonomous vehicle 510. In the non-limiting example depicted in FIG. 5, the traffic cones 550 or the sign 530 represent physical objects that are placed within the road.

Referring back to FIG. 4, at step 420 the processor may retrieve, using the at least one attribute, a graphical overlay presenting a virtual object corresponding to the revised road condition having the at least one attribute, wherein the virtual object represents an object that is not captured by at least one sensor of the autonomous vehicle.

Using one or more attributes of the event and/or the revised conditions, the processors may query one or more servers (e.g., internal and external sources) to determine how to revise the autonomous vehicle path and/or whether any particular visual elements should to be added to the HD map. For instance, a construction site may necessitate that a lane is closed via traffic cones (e.g., attribute of the revised road conditions). As a result, the processor may retrieve one or more graphical overlays corresponding to virtual objects that can be displayed to the drive to indicate the revised road conditions. These objects, though not present on the road and not captured by the sensors of the autonomous vehicle (e.g., no image of the virtual objects is captured by a camera of the vehicle because the object, e.g., traffic cone, is not physically placed on the road).

Accordingly, the processor may query to identify one or more traffic cone graphical overlays. In another example, an event may require a temporary reduction of speed. As a result, the processor may query and retrieve a graphical overlay of a speed limit sign with a number that is lower than the normal speed limit of the road.

At step 430, the processor may display, on an electronic device associated with the autonomous vehicle, the graphical overlay while the electronic device is presenting an image of a surrounding of the autonomous vehicle. The processor may display the graphical overlay retrieved in the step 420. In some embodiments, the graphical overlay may be displayed as an augmented reality (AR) overlay, which is displayed in addition to a series of images received from a camera associated with the processor.

The processor may first identify an electronic device associated with the autonomous vehicle. Non-limiting examples of electronic devices may include smart glasses or smart windshields that communicate with one or more sensors that capture images/video of the autonomous vehicle's surroundings (e.g., live feed of the road).

Non-limiting examples of displaying methods may include:

Head-Up Display (HUD)—A transparent display that projects information onto the windshield, allowing the driver to view information without looking away from the road.

Central Display-A screen located in the autonomous vehicle (e.g., center console) that provides the driver with information on navigation, entertainment, climate control, and vehicle status.

Instrument Cluster Display-A display that replaces traditional analog gauges and displays information such as speed, fuel level, and warning messages.

Surround View Monitor-A display that provides a 360-degree bird's-eye view of the vehicle's surroundings, including the front, rear, and sides of the vehicle.

Augmented Reality Head-Up Display (AR HUD)—An advanced form of HUD that displays additional information, such as road signs, obstacles, and lane markers, superimposed on the real-world view.

Augmented Reality Glasses-Wearable displaying screens may include a pair of glasses for superimposing digital information (e.g., an overlay) onto the real world. The AR glasses may include a frame with a pair of clear lenses, a pair of cameras for capturing the real-world view (or may be in communication with the camera of the autonomous vehicle), and a processor for processing the images captured by the cameras and generating the AR display.

Smart Windshield-A screen positioned as the autonomous vehicle's windshield that digitally displays a view corresponding to the autonomous vehicle's position (e.g., live feed captured by one or more cameras).

The processor may use the captured live video feed of the road using one or more sensors of the autonomous vehicle (e.g., a camera mounted on the autonomous vehicle, detecting road features (such as lane designations, road signs) and other vehicles) and project the live feed on an electronic device associated with the autonomous vehicle. The graphical overlay may include information, such as navigation instructions, traffic updates, and alerts for potential hazards. In this way, the processor may display video feed (in real time or near real time) that is captured by a camera of the autonomous vehicle showing the autonomous vehicle's surroundings. Additionally, the processor may superimpose virtual objects (e.g., graphical overlays for one or more virtual objects) that are not captured by the camera (or other sensors). For instance, the processor may determine that the revised road conditions necessitate presenting a sign (or other object) indicating that the vehicle is approaching a construction site. As a result, even though the camera of the autonomous vehicle has not captured the sign (because the sign does not physically exist within the vehicle's surroundings), the processor shows an augmented reality representation of the sign.

The processor may generate an AR display by overlaying digital information, such as text, graphics, or videos, onto the real-world view. The display may be projected onto the lenses of the display (e.g., AR glasses), allowing the driver to see the AR display while still being able to see the real world.

Moreover, the processor may also be in communication with a set of sensors for detecting the driver's head movements and for adjusting the position and orientation of the AR display in real-time. This method may be more effective for certain displaying mechanisms. Therefore, the processor may use this method for certain displaying mechanisms only, such as for AR glasses but not smart windshields.

The AR display may provide the driver with an immersive and interactive experience by allowing them to see digital information of HD maps superimposed onto the real world. Moreover, the processor may allow the driver to customize the display in accordance with their preferences. For instance, a driver may turn the graphical overlay (or parts of the graphical overlay) on or off.

When the processor identifies a revised road condition, the processor may additionally transmit information about the revised road condition to other vehicles, such as vehicles on the roadway behind the vehicle. The other vehicles can also obtain this information from the database that is updated by the vehicle. As a result, the other vehicles can present an appropriate graphical overlay and/or otherwise adjust to the revised road condition.

Figure 6A:
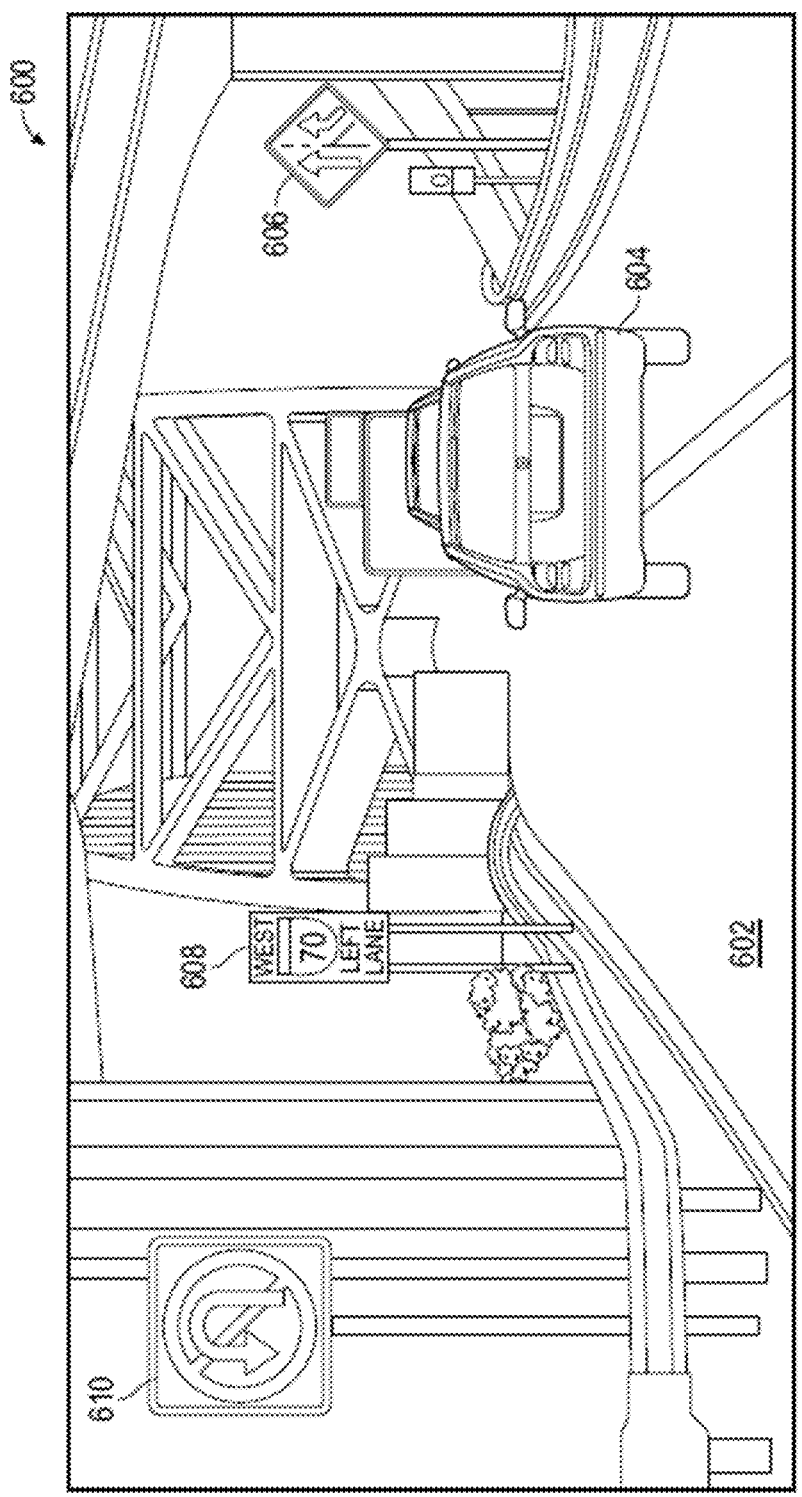
FIGS. 6A, 6B, and 7 depict intelligent displays, according to various embodiments.
Figure 6B:
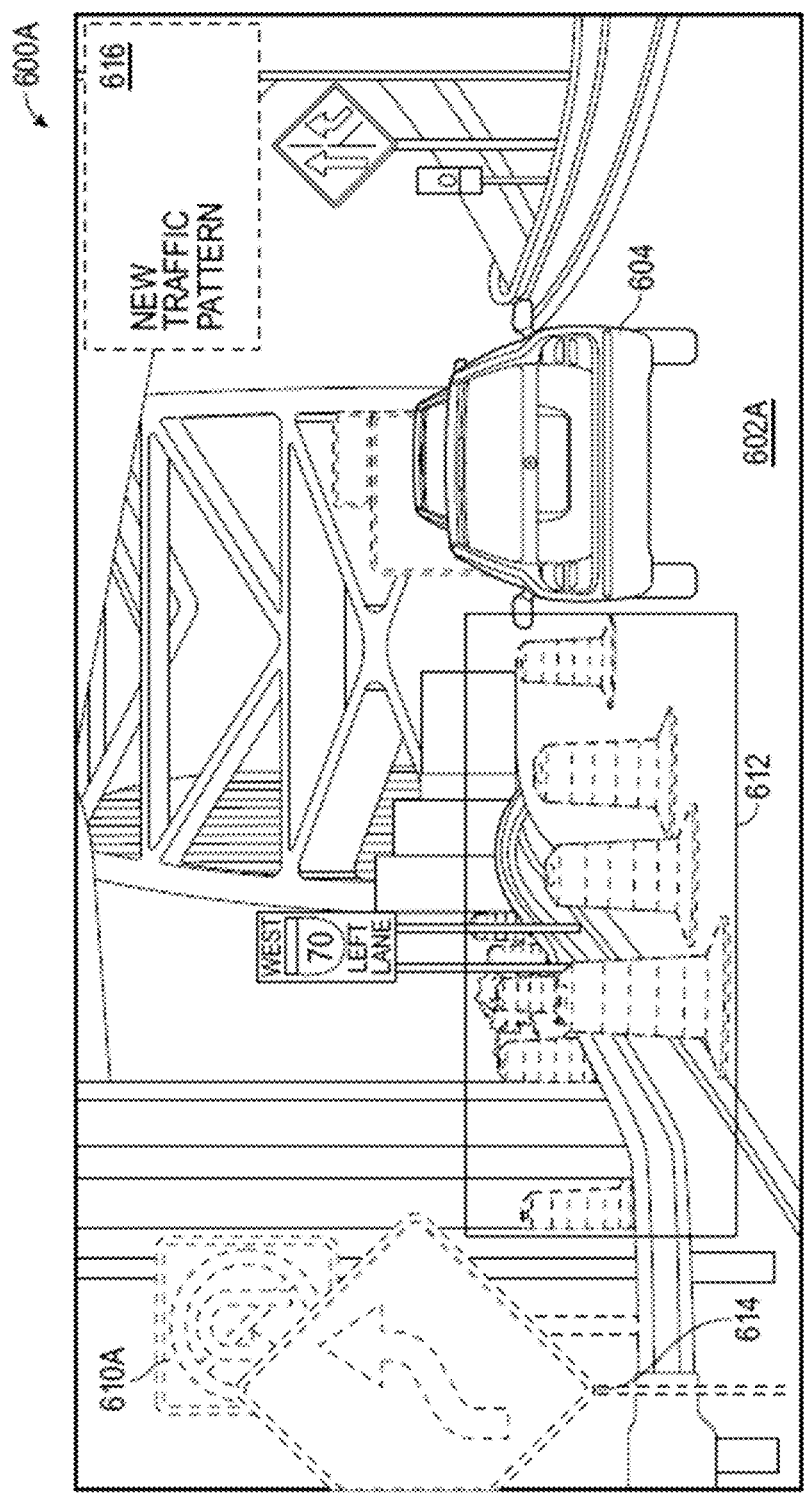

Referring now to FIGS. 6A-6B, a non-limiting example of display graphical overlays is presented. In the depicted embodiments, displays 600 and 600A represent how an electronic device displays the autonomous vehicle's surrounding to the driver. For instance, the displays 600 or 600A may correspond to how a driver's AR glasses can use the methods and systems discussed herein to display the vehicle's surroundings. In some embodiments, at least a part of the methods to display the depicted intelligent (e.g., AR, graphical) display can be performed by a processor of the electronic device itself. Additionally or alternatively, the processor of the electronic device may receive instructions from another processor (e.g., a processor of the autonomous vehicle, such as the processor discussed in FIG. 4) to display the graphical overlays. Therefore, the methods discussed herein can be performed in any order and by any of the devices discussed herein.

In the depicted embodiment, the autonomous vehicle being driven is not shown. Instead the displays 600 and 600A depict the autonomous vehicle's surroundings. The autonomous vehicle may be driving on the road 602 (having two lanes) with other vehicles (e.g., vehicle 604 driving in the right lane). The processor may use various methods to determine the autonomous vehicle's position. The processor may also recognize road signs 606, 608, and 610. Using the methods discussed herein, the processor may determine that the autonomous vehicle is located within a predetermined threshold from an event that requires revising its display. Specifically, the processor determines that the autonomous vehicle has a trajectory that includes a construction site.

The processor determines that the construction site requires that the left lane of the road 602 be closed and the traffic (of the left lane) tapered off towards the right lane. Specifically, the processor may determine that the processor must show traffic cones on the left lane for the driver where the traffic cones gradually direct the driver towards the right lane to avoid the construction site (located at the left lane). The processor may then query one or more data sources to identify AR overlays for traffic cones, traffic signs, and other objects needed to warn the driver.

As depicted in the display 600A, the processor may display a graphical overlay 612 that uses AR to show various virtual objects (e.g., traffic cones) guiding the driver to move to the right lane and/or not use the left lane. Additionally or alternatively, the processor may display the graphical overlay 614 indicating that the driver should change lanes to the right lane. Additionally or alternatively, the processor may omit one or more road signs (or other road features existing in real life that were captured by the camera). For instance, as depicted in FIG. 6A, the road sign 610 exists in reality and can be displayed. However, the sign 610A (as depicted in FIG. 6B within the road 602A) is shown as dashed indicating that the processor may either eliminate its display or use a different color (e.g., greyed out protocol).

In some embodiments, the processor may also display a notification for the driver. For instance, the processor may display the notification 616 informing the driver that the traffic pattern is changing. In other embodiments, the notification may include information (e.g., "approaching a construction site") and/or instructions (e.g., "please change your lane now"), and the like.

The FIG. 6A may represent a view of the camera captured by a vehicle. Therefore, the display 600 includes objects that are physically present within the road. In contrast, FIG. 6B depicts how the display 600A can include additional virtual objects, such as graphical overlays 612 depicting traffic cones (virtual objects) that do not exist on the road. Therefore, the display 600A includes both physical objects and virtual objects.

In some embodiments, the processor may display various features extracted using one or more sensors (and as a result of analyzing the data received via the one or more sensors of the autonomous vehicle) regardless of whether an event has occurred or any road condition has been or needs to be revised. For instance, using the data received from the sensors, the processor may generate an HD map. As used herein, an HD map may refer to a digital representation of the physical environment that includes detailed information about the road network, including lane geometry, road signs, traffic signals, and other relevant information.

The HD map may be generated using data from various sources, including satellite imagery, LiDAR scans, and on-board sensors from vehicles. The data may be processed (by any processor associated with the autonomous vehicle) to create a highly accurate and detailed 3D model of the road network and its surroundings. The HD map may be periodically updated to reflect changes in the physical environment, such as road construction, road closures, and other dynamic conditions. In some embodiments, the HD map may be used by autonomous vehicles and other navigation systems to plan routes, navigate roads, and make decisions about driving actions. The HD map may provide the autonomous vehicle with a detailed and accurate understanding of the road network and its surroundings. The HD map may also include additional information, such as the locations of road hazards, speed limits, and other relevant data. This information is used by autonomous vehicles and other navigation systems to make informed decisions about driving actions and to avoid potential hazards.

Figure 7:
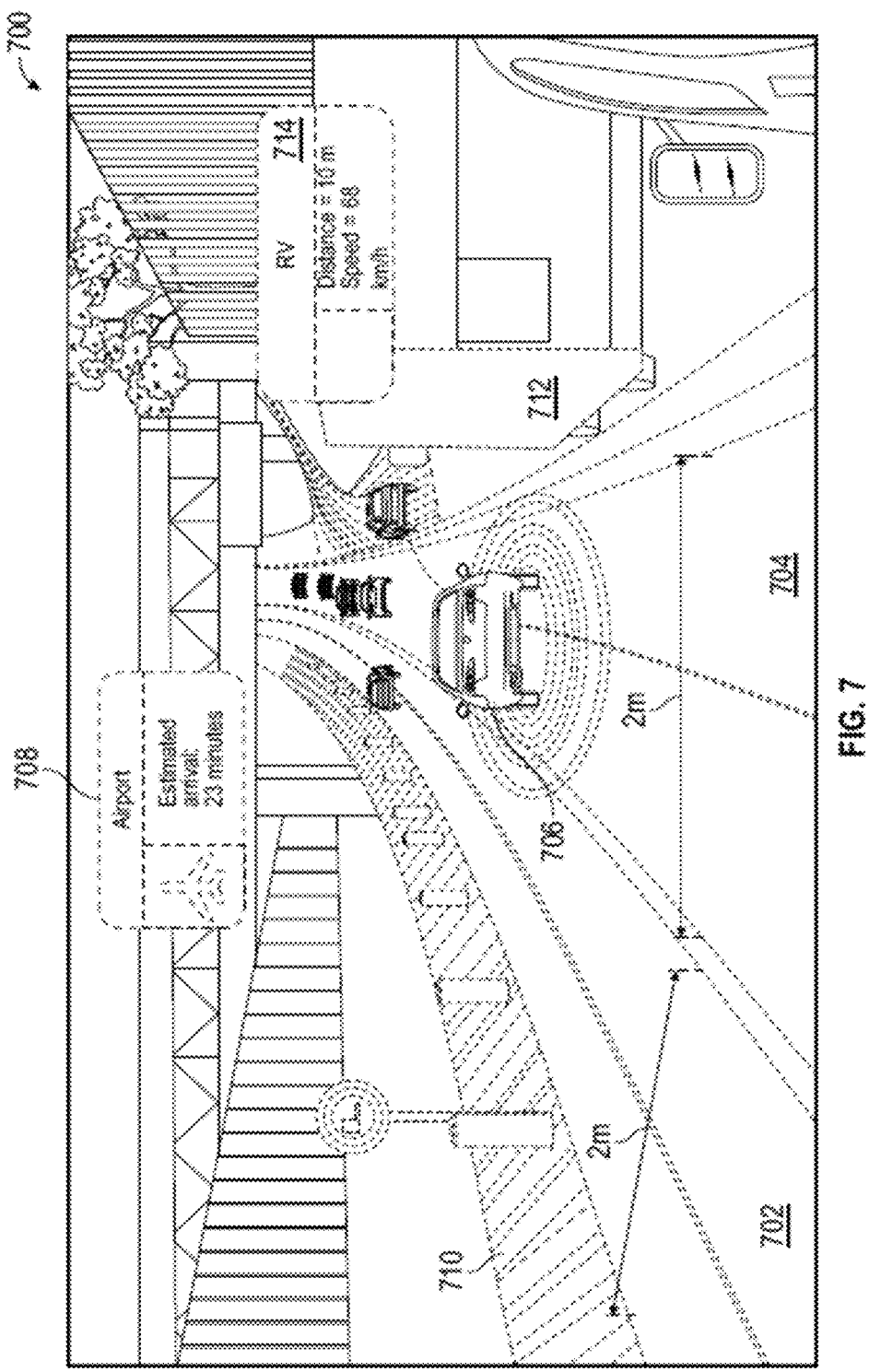

In some embodiments, the processor may display the HD map for the driver. In one example, the processor may display the interface 700, depicted in FIG. 7. The interface 700 may include features from real life and graphical overlays added using AR methods. For instance, the interface 700 displays a front shield view of a vehicle driving in a lane 704. The interface 700 displays the vehicle 706 and 712 (among other vehicles) that are also on the road. However, the interface 700 includes various graphical overlays that indicate features extracted using sensor data. For instance, the interface 700 may include various distances (e.g., width of lane 704 and 702). In another example, the graphical overlay 710 indicates the edge of the lane 702. In another example, the graphical overlay 714 indicates information regarding the vehicle 712. In another example, the vehicle 706 may include a graphical overlay of concentric circles indicating a safe distance for traveling. In some embodiments, a graphical overlay 708 may correspond to a real sign. In one example, the graphical overlay 708 may present an advertisement to the driver, and such a graphical overlay 708 may appear as a billboard but only exist as a virtual object on the graphical overlay. However, certain information may be revised using sensor data. For instance, the processor may determine that the vehicle is traveling to the airport and may dynamically revise the graphical overlay 708 to provide an estimated arrival (e.g., based on the vehicles speed and existing traffic).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:
1. A method comprising:
   determining, by a processor of an autonomy system of an autonomous vehicle, that a current trajectory of the autonomous vehicle includes a revised road condition captured by at least one sensor of the autonomous vehicle, the processor included in the autonomous vehicle;

retrieving, by the processor, a graphical overlay presenting a virtual object indicating the revised road condition, wherein the virtual object represents an object that is not captured by the at least one sensor of the autonomous vehicle; and presenting, by the processor for display on an electronic device associated with the autonomous vehicle, the graphical overlay while the electronic device is presenting a view of a surrounding of the autonomous vehicle.

2. The method of claim 1, wherein the graphical overlay is presented as an augmented reality presentation.

3. The method of claim 1, wherein the revised road condition corresponds to construction work performed and the graphical overlay comprises a lane change.

4. The method of claim 1, further comprising:
presenting, by the processor, a notification indicating that at least one road condition has been revised.

5. The method of claim 1, wherein determining that the current trajectory of the autonomous vehicle includes the revised road condition corresponds to receiving an indication from a second processor.

6. The method of claim 1, wherein determining that the current trajectory of the autonomous vehicle includes the revised road condition corresponds to receiving an indication of the revised road condition within the road.

7. The method of claim 1, further comprising:
revising, by the processor, a velocity of the autonomous vehicle in accordance with the revised road condition.

8. The method of claim 1, further comprising:
identifying, by the processor, an alternative trajectory for the autonomous vehicle in accordance with the revised road condition.

9. An autonomous system of an autonomous vehicle, comprising:
one or more processors included in the autonomous vehicle, wherein the one or more processors are configured execute instructions on a non-transitory computer-readable medium to:
determine that a current trajectory of the autonomous vehicle includes a revised road condition captured by at least one sensor of the autonomous vehicle;
retrieve a graphical overlay presenting a virtual object indicating the revised road condition, wherein the virtual object represents an object that is not captured by the at least one sensor of the autonomous vehicle; and
present for display, on an electronic device associated with the autonomous vehicle, the graphical overlay while the electronic device is presenting a view of a surrounding of the autonomous vehicle.

10. The system of claim 9, wherein the graphical overlay is presented as an augmented reality presentation.

11. The system of claim 9, wherein the revised road condition corresponds to construction work performed and the graphical overlay comprises a lane change.

12. The system of claim 9, wherein the one or more processors are configured to present a notification indicating that at least one road condition has been revised.

13. The system of claim 9, wherein determining that the current trajectory of the autonomous vehicle includes the revised road condition corresponds to receiving an indication from a second processor.

14. The system of claim 9, wherein the one or more processors are configured to determine that the current trajectory of the autonomous vehicle includes the revised road condition corresponds to receiving an indication of the revised road condition within the road.

15. The system of claim 9, wherein the one or more processors are configured to revise a velocity of the autonomous vehicle in accordance with the revised road condition.

16. The system of claim 9, wherein the one or more processors is configured to identify an alternative trajectory for the autonomous vehicle in accordance with the revised road condition.

17. A non-transitory computer readable medium including one or more instructions stored thereon and executable by a processor of an autonomy system of an autonomous vehicle, the processor included in the autonomous vehicle, in response to being executed, the one or more instructions cause the autonomy system to:
determine that a current trajectory of the autonomous vehicle includes a revised road condition captured by at least one sensor of the autonomous vehicle;
retrieve a graphical overlay presenting a virtual object indicating the revised road condition, wherein the virtual object represents an object that is not captured by the at least one sensor of the autonomous vehicle; and
present for display, on an electronic device associated with the autonomous vehicle, the graphical overlay while the electronic device is presenting a view of a surrounding of the autonomous vehicle.

18. The non-transitory computer readable medium of claim 17, wherein the graphical overlay is presented as an augmented reality presentation.

19. The non-transitory computer readable medium of claim 17, wherein the one or more instructions further cause the autonomy system to determine that the current trajectory of the autonomous vehicle includes the revised road condition corresponds to receiving an indication of the revised road condition within the road.

20. The non-transitory computer readable medium of claim 17, wherein the one or more instructions further cause the autonomy system to revise a velocity of the autonomous vehicle in accordance with the revised road condition.

* * * * *